(12) United States Patent
Achkir

(10) Patent No.: US 10,345,528 B1
(45) Date of Patent: Jul. 9, 2019

(54) FIBER COUPLING WITH A PHOTONIC WAVEGUIDE FORMED FROM CORE MATERIAL WITH TUNED INDEX OF REFRACTION

(71) Applicant: CISCO TECHNOLOGY, INC., San Jose, CA (US)

(72) Inventor: D. Brice Achkir, Livermore, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 16/144,294

(22) Filed: Sep. 27, 2018

(51) Int. Cl.
| | |
|---|---|
| G02B 6/36 | (2006.01) |
| G02B 6/02 | (2006.01) |
| G02B 6/122 | (2006.01) |
| G02B 1/04 | (2006.01) |
| G02B 6/26 | (2006.01) |

(52) U.S. Cl.
CPC ........... *G02B 6/3652* (2013.01); *G02B 1/046* (2013.01); *G02B 6/02038* (2013.01); *G02B 6/02304* (2013.01); *G02B 6/1221* (2013.01); *G02B 6/262* (2013.01)

(58) Field of Classification Search
None
See application file for complete search history.

(56) References Cited

U.S. PATENT DOCUMENTS

| | | | |
|---|---|---|---|
| 4,346,961 A | 8/1982 | Porter et al. | |
| 5,369,719 A | 11/1994 | Mishima | |
| 5,600,745 A | 2/1997 | Wuu et al. | |
| 5,710,854 A | 1/1998 | Myers et al. | |
| 6,671,438 B2 | 12/2003 | Ido et al. | |
| 7,224,870 B2 | 5/2007 | Margalit et al. | |
| 8,542,961 B2 | 9/2013 | Kuo et al. | |
| 8,937,024 B2* | 1/2015 | Bergmann | ........ H01L 27/14601 438/799 |
| 8,938,148 B2 | 1/2015 | Achkir | |
| 9,658,397 B1 | 5/2017 | Achkir | |
| 2006/0159411 A1* | 7/2006 | Miller | .................... B82Y 20/00 385/129 |
| 2008/0138015 A1* | 6/2008 | Song | ...................... B82Y 20/00 385/49 |
| 2013/0243383 A1 | 9/2013 | Agarwal et al. | |
| 2015/0293299 A1 | 10/2015 | Xu et al. | |

FOREIGN PATENT DOCUMENTS

KR   20050023178   * 3/2005

OTHER PUBLICATIONS

Roger Dangel et al., "Polymer waveguides for electro-optical integration in data centers and high-performance computers", Optical Society of America, Feb. 23, 2015,vol. 23, No. 4.
J. V. Galan et al., "Low-loss coupling technique between SOI waveguides and standard single-mode fibers", www.-ecio-conference.org, Aug. 24, 2018.

* cited by examiner

*Primary Examiner* — Chad H Smith
(74) *Attorney, Agent, or Firm* — Cindy Kaplan

(57) ABSTRACT

In one embodiment, an apparatus comprises a photonic waveguide formed in an element of core material and comprising a waveguide core extending within the core material and surrounded by core material with a modified index of refraction, and a fiber positioned in a slot formed in the element of core material with a core of the fiber aligned with the waveguide core. A method for forming the photonic waveguide and fiber coupling is also disclosed herein.

20 Claims, 7 Drawing Sheets

FIBER COUPLING WITH A PHOTONIC WAVEGUIDE FORMED FROM CORE MATERIAL WITH TUNED INDEX OF REFRACTION

TECHNICAL FIELD

The present disclosure relates generally to optical components, and more particularly, to photonic waveguides.

BACKGROUND

Optical link technology is being increasingly integrated into high speed systems to provide advantages in bandwidth and power efficiency as compared with electrical interconnects. At the printed circuit board (PCB) level, waveguide technology is being integrated to carry large amounts of data at higher speeds, while attempting to solve signal integrity issues associated with copper. A difficulty in the production of optical components is in the stage of aligning an optical fiber with a waveguide. Improper alignment leads to significant losses and degraded performance.

BRIEF DESCRIPTION OF THE DRAWINGS

Corresponding reference characters indicate corresponding parts throughout the several views of the drawings.

DESCRIPTION OF EXAMPLE EMBODIMENTS

Overview

Figure 1:
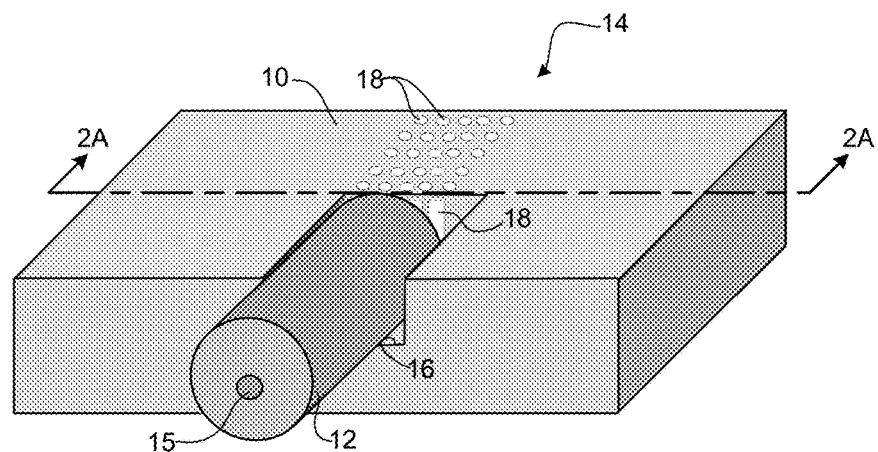
FIG. 1 is a perspective of a photonic waveguide coupled to a fiber, in accordance with one embodiment.

In one embodiment, an apparatus generally comprises a photonic waveguide formed in an element of core material and comprising a waveguide core extending within the core material and surrounded by core material with a modified index of refraction, and a fiber positioned in a slot formed in the element of core material with a core of the fiber aligned with the waveguide core.

In another embodiment, a method generally comprises defining a waveguide core location in a layer of core material, forming a slot for receiving a fiber in the core material, modifying the core material surrounding the waveguide core location to form the waveguide core and create a photonic waveguide, and inserting the fiber into the slot to couple the fiber to the photonic waveguide with a core of the fiber aligned with the waveguide core.

In yet another embodiment, an apparatus generally comprises a photonic waveguide comprising a layer of core material and a waveguide core extending through the core material and a fiber positioned in a slot formed in the photonic waveguide with a core of the fiber aligned with the waveguide core. The core material surrounding the waveguide core is modified to simulate clad material.

Further understanding of the features and advantages of the embodiments described herein may be realized by reference to the remaining portions of the specification and the attached drawings.

Example Embodiments

The following description is presented to enable one of ordinary skill in the art to make and use the embodiments. Descriptions of specific embodiments and applications are provided only as examples, and various modifications will be readily apparent to those skilled in the art. The general principles described herein may be applied to other applications without departing from the scope of the embodiments. Thus, the embodiments are not to be limited to those shown, but are to be accorded the widest scope consistent with the principles and features described herein. For purpose of clarity, details relating to technical material that is known in the technical fields related to the embodiments have not been described in detail.

Photonic waveguides (optical waveguides, polymer waveguides (PWGs)) are increasingly being used to address limitations of the use of copper as interconnects in electronic components. Photonic waveguides may be used, for example, to distribute optical signals, similar to the function of copper traces and vias in high density electrical laminates, and form the interface between a silicon photonics chips and a fiber cable. Copper traces may be replaced with photonic waveguides at various levels, including for example, chip, printed circuit board (PCB), and backplane. Photonic waveguides provide high bandwidth, low integration cost, similarity in fabrication processes with laminates and allow for use of the same routing tools. Although the process of building polymer waveguides is similar and compatible with printed circuit boards, the tolerances due to a mask alignment process for sequential buildup of the waveguide may not allow for coupling with a single mode fiber.

In order to design a full photonic channel that can span for long distances, there is a need to couple the photonic waveguide with a glass fiber. Efficient coupling between fibers and waveguides is very important. Conventional fiber and waveguide coupling techniques include waveguide and fiber termination with connectors, however, this may lead to an increase in coupling losses and return loss. In another example, butt coupling may be used. A drawback with this technique is that the differences in the characteristics of the polymer waveguide and fiber may also lead to an increase in losses. While this may be managed in multimode waveguides, due to the sizes of the cores involved in single mode, the fabrication process becomes difficult and requires active alignment that may increase cost of the assembly.

The embodiments described herein provide a technique that may be used to tune and couple waveguides to fibers. As described in detail below, the waveguide tuning technique is used with a trenching technique to passively couple the waveguide to the fiber with low losses to provide an efficient coupling between the fiber and waveguide.

In one or more embodiments, the core material index of refraction is changed while preserving optical properties. For example, the index of refraction of the core material may be modified (tuned) to produce an effective index of refraction of the waveguide that is similar to a waveguide with only clad material surrounding the waveguide core. As described below, simulations may be performed to identify how to modify the core material so that the effective refractive index of the waveguide is approximately the same as the effective refractive index of the waveguide with a core surrounded with clad material. This allows for a single mode waveguide with a larger core size that corresponds to an optical fiber.

The photonic waveguides described herein may be polymer waveguides or waveguides fabricated with other suitable material including, for example, glass sheets. For simplification, the description herein focuses on polymer waveguides, but the same concepts may be applied to other types of photonic waveguides. The embodiments described herein may be used for single mode and multimode waveguides and for any wavelength space. For simplification, the following examples describe single mode waveguides, but it is to be understood that this is only an example and the embodiments described herein may also be used for multimode waveguides.

In order to build conventional polymer waveguides, two materials are needed, one for the clad (cladding layer) and the other for the core (core layer). The embodiments described herein tune the core material used to form the waveguide to simulate (mimic) the clad material that typically surrounds the core of the waveguide, which allows the waveguide core to be formed such that it is surrounded at least in part by modified (tuned) core material. As described below, the waveguide is tuned and coupled to a fiber, with aligned cores and matching signals between the waveguide and fiber.

In one embodiment, an apparatus comprises a photonic waveguide formed from an element of core material and comprising a waveguide core surrounded by core material with a modified index of refraction and a fiber positioned in a slot formed in the element of core material with a core of the fiber aligned with the waveguide core.

Referring now to the drawings, and first to FIG. 1, an example of a single mode photonic waveguide 10 coupled to a fiber 12 is shown. The coupled fiber and waveguide assembly is generally indicated at 14. As described below, the photonic waveguide 10 comprises a waveguide core (not shown) aligned with a core 15 of the fiber 12 positioned within a slot (trench, groove) 16. In one or more embodiments, the core material surrounding the waveguide core may be modified by air within holes 18 or by injecting another material (e.g., by using a mosquito technique to form the holes) with a lower index of refraction than the core material to reduce the index of refraction of the core material surrounding the waveguide core so that it is the same (e.g., generally the same or close) to the index of refraction of a clad material. More specifically, the core material surrounding the waveguide core is tuned such that the photonic waveguide has approximately the same effective refractive index as a photonic waveguide with the core surrounded by only clad material.

Figure 2A:
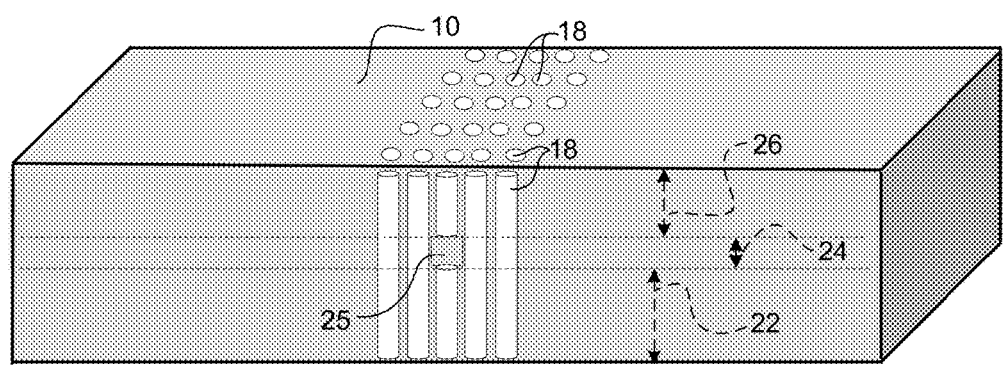
FIG. 2A is a perspective cross-section of the photonic waveguide taken through line 2A-2A of FIG. 1.

FIG. 2A is a cross-section perspective taken through line 2A-2A in FIG. 1 showing details of the waveguide 10. In this example, the waveguide is formed from a core material block 30 (shown in FIG. 3). As shown in FIG. 2A, the waveguide 10 comprises a lower portion 22, a core portion 24, and an upper portion 26 (lower and upper portions indicated by arrows and dashed lines in FIG. 2A with the core portion interposed therebetween). A waveguide core 25 extends through the core portion 24. In the example, shown in FIG. 2A and described herein, the photonic waveguide is formed in a core material block (element).

In another example, the lower portion 22, core portion 24, and upper portion 26 may be defined by individual layers of material as described in U.S. patent application Ser. No. 16/103,901, entitled "Photonic Waveguide Formed From Core Material With Tuned Index of Refraction", filed Aug. 14, 2018, which is incorporated by reference herein in its entirety. In one example, a waveguide core layer may be interposed between a lower cladding layer (lower portion) and an upper cladding layer (upper portion) and the openings 18 formed only in the area adjacent to the core 25 in the core layer 24.

Figure 2B:
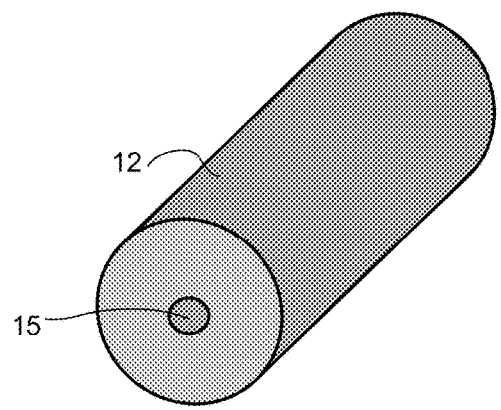
FIG. 2B is a perspective of the partial fiber of FIG. 1 removed from the photonic waveguide.

The fiber 12 shown in FIG. 2B may be formed from glass or any other suitable material. In the example described below, the core diameter is 10 μm and the cladding diameter is 125 μm.

FIGS. 3-5B illustrate simplified steps in a process for forming the coupled fiber and waveguide shown in FIG. 1, in accordance with one embodiment. In the following example, the number of steps described is limited for simplification. It is to be understood that variations may be used in the process or processing steps may be added, without departing from the scope of the embodiments.

In this example, the process starts with a 135 μm thick layer of core material 30 (e.g., element, block formed from a single material). This block height corresponds to 57.5 μm (lower portion) (future modified core (clad)) (dimension 22 in FIG. 2A)+10 μm (core portion) (dimension 24 in FIG. 2A)+57.5 μm (upper portion) (future modified core (clad)) (dimension 26 in FIG. 2A). In this example, an additional 10 μm is added for the buffer reference plane, which may also be a different dimension (e.g., thinner). A 10 μm waveguide core 32 will be formed inside the core material block 30 as indicated by boundaries (dashed lines) 32 in FIG. 3. The dashed lines 32 show where the waveguide core 25 will be located after the core material is modified (as shown in FIG. 5A and described below).

Figure 4:
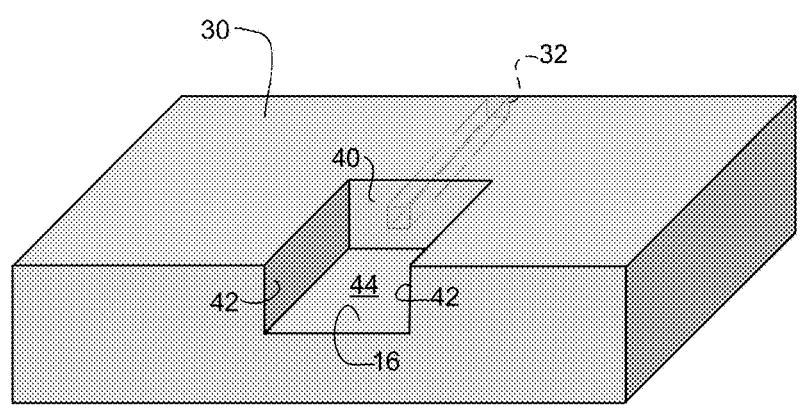
FIG. 4 illustrates a second step in the process for forming the photonic waveguide.

As shown in FIG. 4, the trench (groove, slot) 16 is created at the location where the fiber 12 will be positioned (FIG. 1). The trench 16 may be formed, for example, with a single etch process. In this example, back wall 40 and side walls 42 are 125 μm high, and the width of the bottom surface 44 is 125 μm for receiving the 125 μm diameter fiber 12. The trench 16 may be formed by any suitable process and may have an accuracy of less than 1 micron, for example. It is to be understood that the shape of the trench 16 shown in FIG. 4 is only an example and other shapes may be formed in the core material block (e.g., V-shaped or U-shaped groove).

Figure 5A:
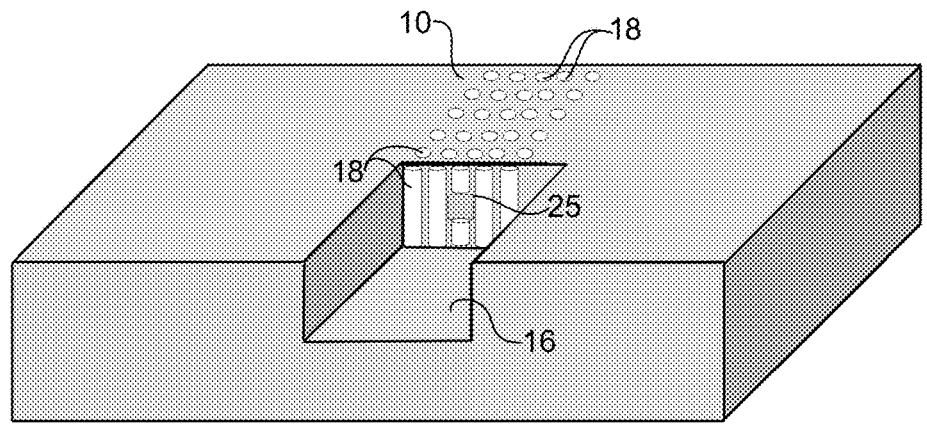
FIG. 5A illustrates a third step in the process for forming the photonic waveguide.

FIG. 5A illustrates one example for modifying the core material surrounding the location of the core 32 (FIG. 4) to create the waveguide core 25. In the example shown in FIG. 5A, cylindrical holes 18 are drilled into the core material surrounding the waveguide core 25 to create the waveguide and provide the desired geometry. The holes 18 are drilled from the top to the bottom on each side of the core 25 and from the top to the waveguide core interface and from the bottom to the waveguide core interface, so that the entire waveguide core is surrounded on all sides by the modified core material. In one example, the holes 18 define air cylinders. In another example, the core material may be modified using a mosquito technique (e.g., material injected into the core at locations 18). The modified core material surrounding the waveguide core 25 simulates clad material, as previously described. The holes 18 are used to tune the refractive index of the core material to match the waveguide 10 and the fiber 12, and signals passing therethrough. The core material may be configured with a different index of refraction based on the type of fiber to be coupled with the waveguide, for example.

Figure 5B:
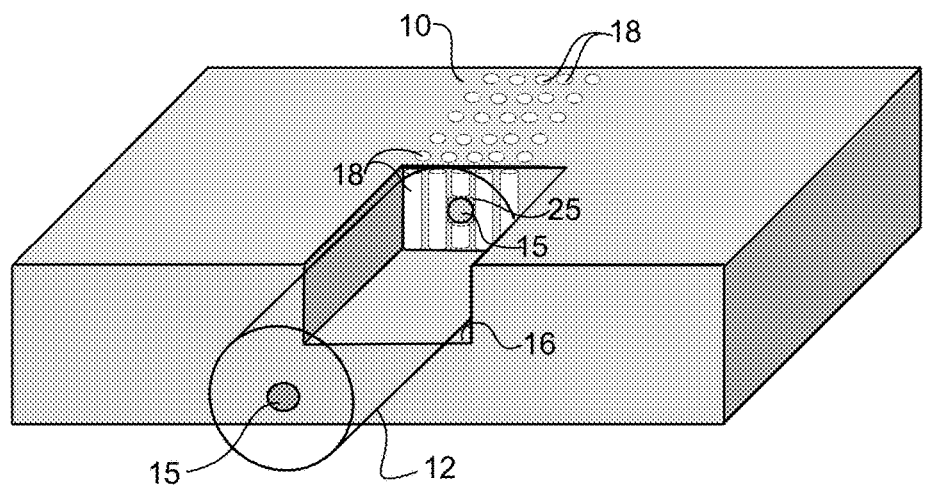
FIG. 5B illustrates the fiber coupled to the photonic waveguide shown in FIG. 5A.

The single mode fiber 12 with 125 µm clad and 10 µm core 15 can now be inserted in the slot (trench) 16 as shown in FIG. 5B to couple the polymer waveguide and fiber 12. The fiber 12 is shown as transparent in FIG. 5B (with the core 15 only shown on the open ends) to illustrate details of the alignment of the fiber core 15 with the waveguide core 25. The high precision and accuracy of the slot 16 formed in the core material allows for perfect (i.e., perfect or near perfect) alignment of the fiber 12 and waveguide 10 without the need for active coupling. Once the fiber 12 is in place within the trench 16, an adhesive may be applied to secure the assembly 14.

It is to be understood that the dimensions described herein are only examples and other dimensions or waveguide core shapes or sizes may be used without departing from the scope of the embodiments. Also, as noted above, the waveguide may be multimode and is not limited to polymer material. It should be noted that there are many different ways that the fiber may be coupled to the waveguide in single or multi-channel configurations and multiple fibers may be coupled to multiple waveguides.

Figure 3:
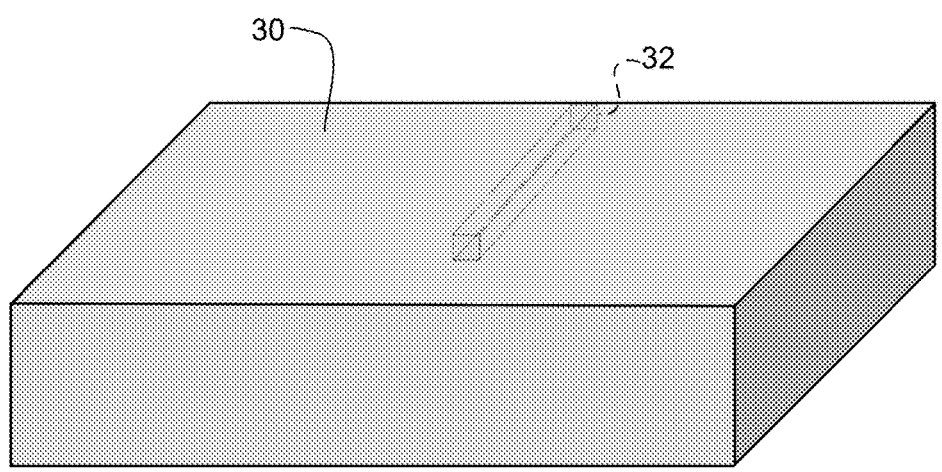
FIG. 3 illustrates a first step in a process for forming the photonic waveguide of FIG. 1.
Figure 6:
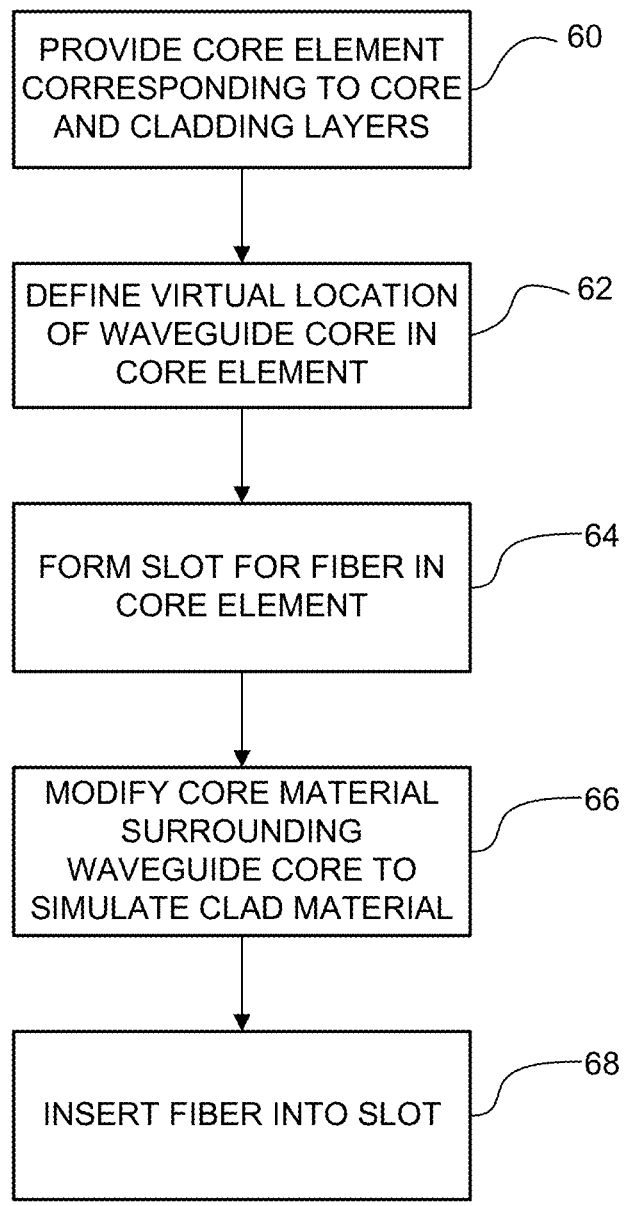
FIG. 6 is a flowchart illustrating an overview of the process for forming the photonic waveguide and fiber coupling shown in FIG. 5B.

FIG. 6 is a flowchart illustrating an overview of a process for forming the photonic waveguide and fiber assembly 14 shown in FIG. 1, in accordance with one embodiment. A core element (block) comprising core material is provided with a thickness corresponding to desired core layer and cladding layers (portions 22, 24, and 26 in FIG. 2A and optional reference plane) (step 60). The waveguide geometry (boundary) (virtual location of waveguide core 32) is defined in the core element to provide a virtual location of the waveguide core (step 62) (FIGS. 3 and 6). The slot (trench) 16 is formed in the core material element 30 (step 64) (FIGS. 4 and 6). The material surrounding the waveguide core is modified to simulate the clad material (step 66) (FIGS. 5A and 6). Air cylinders 18 may be formed in the core material as described above with respect to FIG. 5A, or the material may be injected with another material to provide an effective refractive index corresponding to the effective refractive index of a waveguide formed with clad material. The optical fiber 12 is then inserted into the slot 16 of the completed waveguide with the fiber core 15 aligned with the waveguide core 25 (step 68) (FIGS. 5B and 6).

It is to be understood that the process shown in FIG. 6 is only an example and that steps may be added, removed, combined, reordered, or modified, without departing from the scope of the embodiments. For example, the core material may be modified before creating the trench. Also, as previously described, the lower portion and upper portion of the waveguide may be formed with clad layers and the core material adjacent to the defined location of the waveguide modified to simulate the clad material.

The following describes an example of a process for determining how to modify the core material to simulate clad material. In the following example, a process is described for determining what percentage air is needed to convert the core material surrounding the waveguide core such that it will have generally the same refractive index as cladding layers.

In this example, core material is tuned for a polymer waveguide with a 10 µm square core size with index of refraction $n_1$=1.535 (core) and $n_2$=1.519 (clad) to have characteristics that will allow for coupling with a glass fiber with about a 10 µm core size in guiding optical signal. In order to achieve this, air is introduced into the clad ($n_{air}$=1). A Lumerical Mode Solution design tool was used in this example. First, the effective index for the square waveguide (10 µm×10 µm) with a core index $n_1$=1.535 and clad index $n_2$=1.519 was found to be 1.532385. Air cylinders were added into the model to find the percentage of air needed to obtain the same effective index. Next, the air percentage was identified so that the core material with air cylinders surrounding the core of the waveguide will provide the same effective index of refraction as the waveguide formed with clad material.

The key parameters are the cylinder radius and the spacing between the cylinders. In this example, an Eigenmode Solver simulation was used and the cylinder radius was varied from 10 to 100 nanometers (nm) with two micron spacing between the cylinders. The 2 µm spacing was identified in a previous modeling. Air percentage is defined as the air cylinder area divided by the total core material area with air cylinders. For this example:

Air percentage=2×air cylinder radius/spacing=air cylinder radius/1 µm

Table I below shows the results for a model in which the air cylinder radius was varied from 10 nm to 100 nm with the resulting air percentage and the new effective refractive index included.

TABLE I

| Air Cylinder Radius (nm) | Air Percentage (%) | Effective Refractive Index |
|---|---|---|
| 10 | 1 | 1.53261 |
| 20 | 2 | 1.532496 |
| 30 | 3 | 1.532445 |
| 40 | 4 | 1.532416 |
| 50 | 5 | 1.532395 |
| 60 | 6 | 1.53238 |
| 70 | 7 | 1.532368 |
| 80 | 8 | 1.532358 |
| 90 | 9 | 1.53235 |
| 100 | 10 | 1.532342 |

Figure 7:
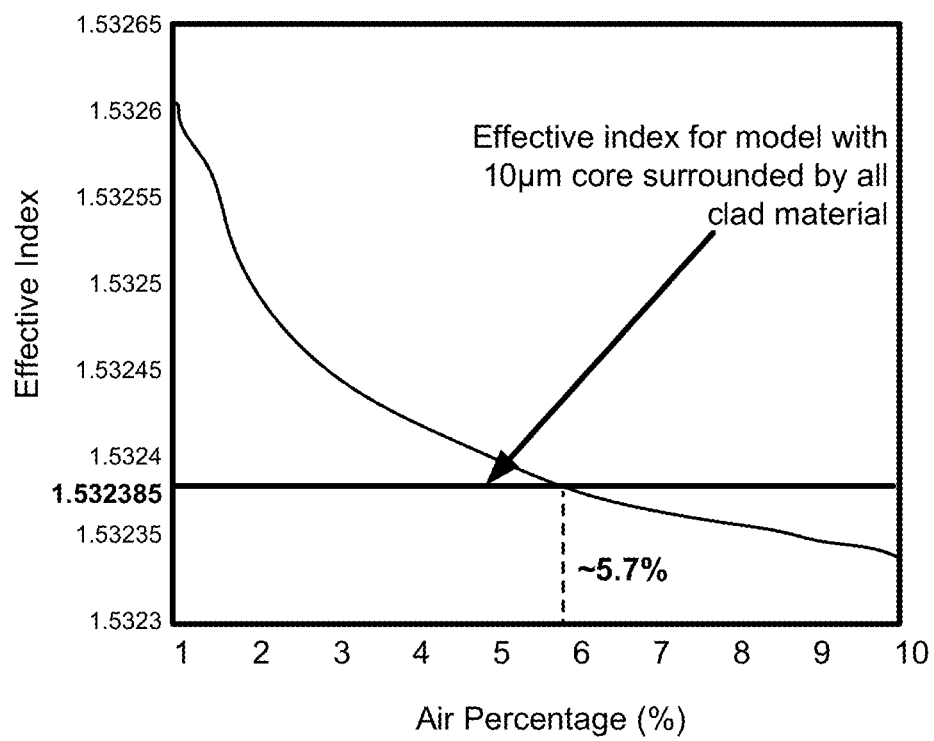
FIG. 7 is an example of a plot of effective index as a function of air percentage for use in determining the percentage of air needed to tune core material of the photonic waveguide, in accordance with one embodiment.

FIG. 7 is a plot of the effective index as a function of air percentage. From this plot the percentage of air needed is identified as 5.7%, which corresponds to an effective index of 1.532385 (the effective refractive index for a 10 µm core surrounded by all clad material) and the corresponding radius of the air cylinders can be identified from Table I. The mode field diameter may also be modeled to verify the calculations, as is well known by those skilled in the art.

The photonic waveguides described herein may be easily integrated with other photonic components for many different implementations or applications. In one example, the photonic waveguide described herein may be integrated with a multi-chip module with an array of VCSELs (Vertical Cavity Surface Emitting Lasers). The photonic waveguide described herein may be used, for example, in integrating single mode silicon photonic components into a chip, PCB, or backplane. The photonic waveguide provides a passive coupling of the fiber and waveguide that may be used for large scale channel count on photonic chips or long reach photonic channels on a PCBA (printed circuit board assembly), for example.

The photonic waveguide may be configured for operation in any type of network device (e.g., router, switch, gateway, controller, edge device, access device, aggregation device, core node, intermediate node, or other network device). The network device may operate in the context of a data communications network including multiple network devices. The network device may communicate over one or more networks (e.g., local area network (LAN), metropolitan area network (MAN), wide area network (WAN), virtual private network (VPN) (e.g., Ethernet virtual private network (EVPN), layer 2 virtual private network (L2VPN)), virtual local area network (VLAN), wireless network, enterprise network, corporate network, data center, Internet, intranet, radio access network, public switched network, or any other network).

Although the method and apparatus have been described in accordance with the embodiments shown, one of ordinary skill in the art will readily recognize that there could be variations made to the embodiments without departing from the scope of the embodiments. Accordingly, it is intended that all matter contained in the above description and shown in the accompanying drawings shall be interpreted as illustrative and not in a limiting sense.

What is claimed is:

1. An apparatus comprising:
    a photonic waveguide formed in an element of core material and comprising a waveguide core extending within the core material and surrounded by core material with a modified index of refraction; and
    a fiber positioned in a slot formed in the element of core material with a core of the fiber aligned with the waveguide core.

2. The apparatus of claim 1 wherein the core material surrounding the waveguide core comprises a plurality of openings to change the index of refraction of the core material.

3. The apparatus of claim 2 wherein said plurality of openings comprise air cylinders reducing the index of refraction of the core material surrounding the waveguide core.

4. The apparatus of claim 1 wherein the core material surrounding the waveguide core comprises a plurality of openings adjacent to, below, and above the waveguide core.

5. The apparatus of claim 1 wherein the core material surrounding the waveguide core comprises an area injected with a material comprising a different index of refraction than an index of refraction of the core material to reduce the index of refraction of the core material.

6. The apparatus of claim 1 wherein the photonic waveguide comprises a polymer single mode waveguide.

7. A method comprising:
    defining a waveguide core location in a layer of core material;
    forming a slot for receiving a fiber in the core material;
    modifying the core material surrounding said waveguide core location to form the waveguide core and create a photonic waveguide; and
    inserting the fiber into said slot to couple the fiber to the photonic waveguide with a core of the fiber aligned with the waveguide core.

8. The method of claim 7 wherein the waveguide core and said slot is formed in a block of core material.

9. The method of claim 7 wherein the modified core material surrounds the entire waveguide core.

10. The method of claim 7 wherein modifying the core material surrounding the waveguide core comprises creating openings in the core material.

11. The method of claim 10 wherein said openings comprise air cylinders.

12. The method of claim 7 wherein modifying the core material surrounding the waveguide core comprises inserting a material with an index of refraction different than an index of refraction of the core material into the core material surrounding the waveguide core.

13. The method of claim 7 wherein the photonic waveguide comprises a polymer single mode waveguide.

14. An apparatus comprising:
    a photonic waveguide comprising a layer of core material and a waveguide core extending through the core material, wherein the core material surrounding the waveguide core is modified to simulate clad material; and
    a fiber positioned in a slot formed in the photonic waveguide with a core of the fiber aligned with the waveguide core.

15. The apparatus of claim 14 wherein the photonic waveguide and said slot is formed within a single block of core material and the modified core material surrounds the entire waveguide core.

16. The apparatus of claim 14 wherein the core material surrounding the waveguide core comprises a plurality of openings to change an index of refraction of the core material.

17. The apparatus of claim 16 wherein said plurality of openings comprise air cylinders reducing the index of refraction of the core material surrounding the waveguide core.

18. The apparatus of claim 14 wherein the core material surrounding the waveguide core comprises an area injected with a material comprising a different index of refraction than an index of refraction of the core material to reduce the index of refraction of the core material.

19. The apparatus of claim 14 wherein the core material surrounding the waveguide core is modified such that an effective refractive index of the photonic waveguide corresponds to the effective refractive index of the waveguide core surrounded by the clad material.

20. The apparatus of claim 14 wherein the photonic waveguide comprises a polymer single mode waveguide and the fiber comprises a glass fiber.

* * * * *